United States Patent
Khawam et al.

(10) Patent No.: US 9,936,434 B2
(45) Date of Patent: Apr. 3, 2018

(54) METHOD AND PHONE SYSTEM FOR PRE-CALL QUALITY OF SERVICE ASSESSMENT OF AVAILABLE NETWORKS

(71) Applicant: RingCentral, Inc., Belmont, CA (US)

(72) Inventors: Patrice Khawam, San Francisco, CA (US); Xiaoqiang Sun, San Jose, CA (US); Tetsumasa Yoshikawa, San Francisco, CA (US)

(73) Assignee: RingCentral, Inc., Belmont, CA (US)

(*) Notice: Subject to any disclaimer, the term of this patent is extended or adjusted under 35 U.S.C. 154(b) by 24 days.

(21) Appl. No.: 15/194,061

(22) Filed: Jun. 27, 2016

(65) Prior Publication Data

US 2017/0374594 A1    Dec. 28, 2017

(51) Int. Cl.
    *H04W 36/30*    (2009.01)
    *H04W 36/36*    (2009.01)
    *H04W 84/12*    (2009.01)

(52) U.S. Cl.
    CPC ......... *H04W 36/30* (2013.01); *H04W 36/365* (2013.01); *H04W 84/12* (2013.01)

(58) Field of Classification Search
    CPC .... H04W 36/365; H04W 36/30; H04W 84/12
    See application file for complete search history.

(56) References Cited

U.S. PATENT DOCUMENTS

| | | | |
|---|---|---|---|
| 8,849,297 B2 | 9/2014 | Balasubramanian | |
| 2004/0085922 A1 | 5/2004 | Herle | |
| 2004/0170122 A1* | 9/2004 | Guo | H04W 36/30 370/210 |
| 2008/0181211 A1* | 7/2008 | Parolkar | H04L 41/5009 370/389 |
| 2010/0172306 A1 | 7/2010 | Gill et al. | |
| 2012/0163344 A1* | 6/2012 | Bakthavathsalu | H04W 36/00 370/332 |
| 2015/0201363 A1* | 7/2015 | Lundqvist | H04W 40/12 370/252 |
| 2015/0237560 A1* | 8/2015 | Saida | H04W 36/365 370/331 |
| 2015/0373574 A1* | 12/2015 | Gordon | H04L 41/5067 370/252 |
| 2017/0188298 A1* | 6/2017 | Pattan | H04W 48/20 |

* cited by examiner

Primary Examiner — Ian N Moore
Assistant Examiner — Justin T Van Roie
(74) Attorney, Agent, or Firm — Finnegan, Henderson, Farabow, Garrett & Dunner LLP

(57) ABSTRACT

A method for providing communication in a communication device is disclosed. The method may include receiving a control instruction for a call session via the communication device, and assessing a quality of service of at least one of a default Wi-Fi network and a radio network. The method may also include selectively recommending to a user of the communication device the radio network for the call session based on the quality of service, and initiating the call session using the default Wi-Fi network or the radio network based on a selection made by the user.

16 Claims, 5 Drawing Sheets

METHOD AND PHONE SYSTEM FOR PRE-CALL QUALITY OF SERVICE ASSESSMENT OF AVAILABLE NETWORKS

TECHNICAL FIELD

The present disclosure generally relates to a telecommunications system and, more particularly, to a phone system having a pre-call quality of service assessment of available networks.

BACKGROUND

Communication devices such as cellular or smart phones using wireless communications have become ubiquitous. Some phones available on the market today are capable of sending and receiving calls by way of a plurality of available wireless communications networks, such as a conventional cellular network (e.g., a radio network) and also a wireless internet network (e.g., a Wi-Fi network implementing IEEE 802.11 technology). In some situations, the radio network may provide a better quality of service (e.g., with regard to delay, jitter, packet loss, bandwidth, latency, etc.) than the Wi-Fi network. In other situations, however, the reverse may be true.

Existing technology may allow for the transfer of a call between networks based on the quality of service (QoS). For example, during a call, the quality of service being provided may be monitored. When the monitored quality of service falls below an acceptable threshold, the call may be transferred between access points on the same network and/or between networks in hopes of improving the quality of service.

Although the existing technology may be acceptable in some situations, it could also be problematic in other situations. For example, by the time that the existing technology determines that the quality of service of the network being used by the phone is low, the user may have already experienced problems (e.g., loss of data, delay, interruption, call drop, etc.) associated with quality.

SUMMARY

Consistent with a disclosed embodiment, a method is established for providing communication in a communication device. The method may include receiving a control instruction for a call session via the communication device, and assessing a quality of service of at least one of a default Wi-Fi network and a radio network. The method may also include selectively recommending to a user of the communication device the radio network for the call session based on the quality of service, and initiating the call session using the default Wi-Fi network or the radio network based on a selection made by the user.

Consistent with another disclosed embodiment, a system is disclosed having a memory with computer-executable instructions stored thereon, and one or more processors configured to execute the stored instructions to receive a control instruction to initiate a call session via the communication device, and assess a quality of service of at least one of a default Wi-Fi network and a radio network. The one or more processors may also selectively recommend to a user of the communication device the radio network for the call session based on the quality of service, and complete the call session using the default Wi-Fi network or the radio network based on a selection made by the user. When the call session includes an outbound call, the one or more processors delay initiating the call session until after: assessing the quality of service, recommending use of the default Wi-Fi network, and receiving a control instruction from the user regarding use of the default Wi-Fi and radio networks for the call session. When the call session includes an inbound call, the one or more processors determine a previous quality of service assessment for the default Wi-Fi network, and recommend to the user of the communication device the radio network for the call session based on the previous quality of service assessment.

Consistent with other disclosed embodiments, non-transitory computer-readable storage media can store program instructions, which are executed by at least one processor device and perform any of the methods described herein.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION

The disclosed embodiments concern a process of assessing quality of service of available wireless communications networks and recommending to a user which network to use when initiating a call session (e.g., when placing an outbound call or receiving an inbound call). In one embodiment, a communication device analyzes a quality of service of available wireless communications networks (e.g., of a default Wi-Fi network and a radio network), and then recommends one of the networks based on the quality. The user may then select via the communication device to use the recommended network for the call session or to override the recommendation and use another network.

For purposes of explanation, the method steps are described herein as being performed by the communication device. However, in some embodiments, the method steps may be performed by a server or a combination of the communication device and the server.

Other features and advantages of the present embodiments are discussed in further detail below with respect to the figures.

Figure 1:
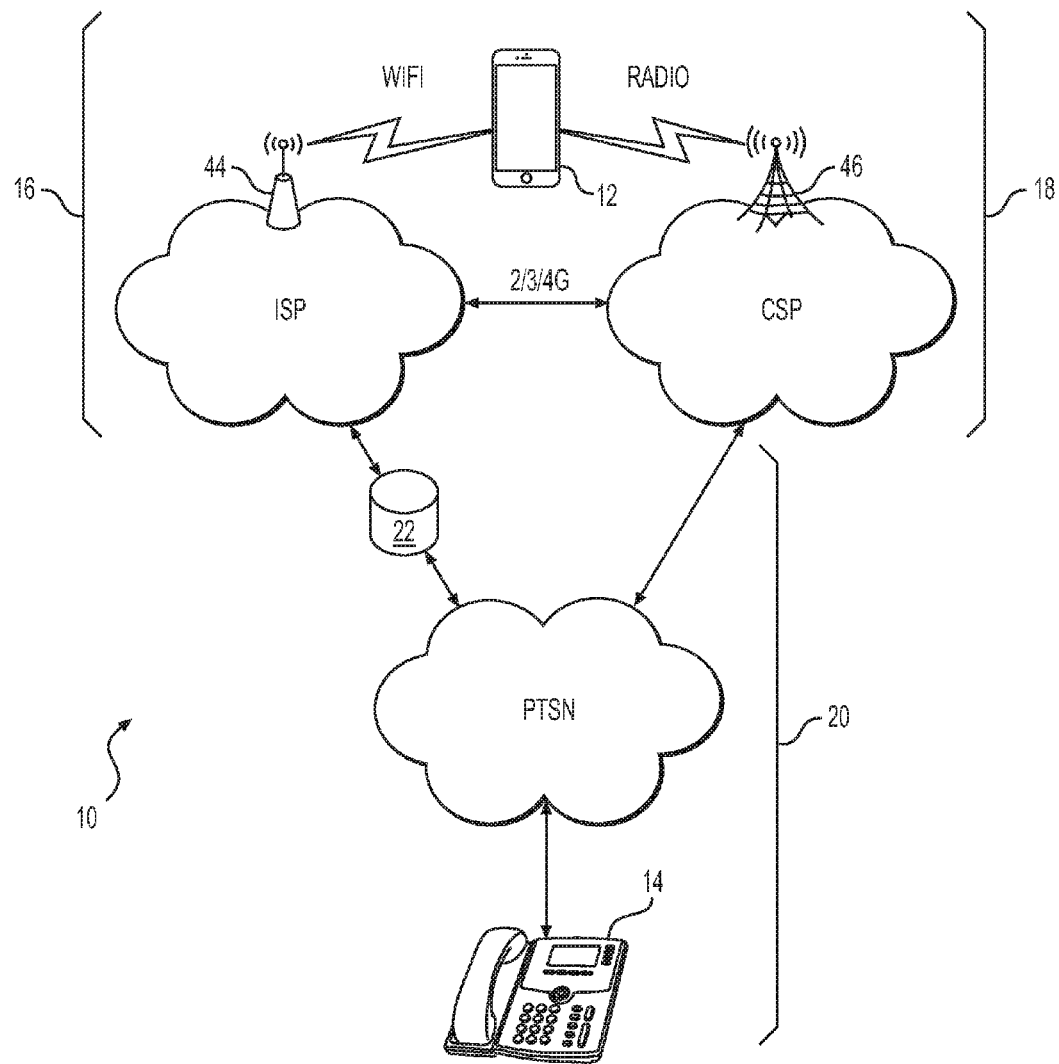
FIG. 1 is a diagram of an example phone system, consistent with the disclosed embodiments.

FIG. 1 is a diagram of a phone system 10 for use in initiating a call session, consistent with disclosed embodiments. As shown in FIG. 1, phone system 10 may include, among other things, a plurality of networks that extend from a first communication device 12 to any number of additional communication devices 14. These networks may include, for example, at least a default Wi-Fi network 16 and a radio network 18. In some embodiments, the networks may additionally include a public switched telephone network (PSTN) 20. An exchange gateway or server 22 may be used to connect default Wi-Fi network 16 with PSTN 20, such that a call session between communication devices 12 and 14 may be completed via any combination of the available networks. The components and arrangements shown in FIG. 1 are not intended to limit the disclosed embodiments, as the system components used to implement the disclosed processes and features can vary.

Figure 2:
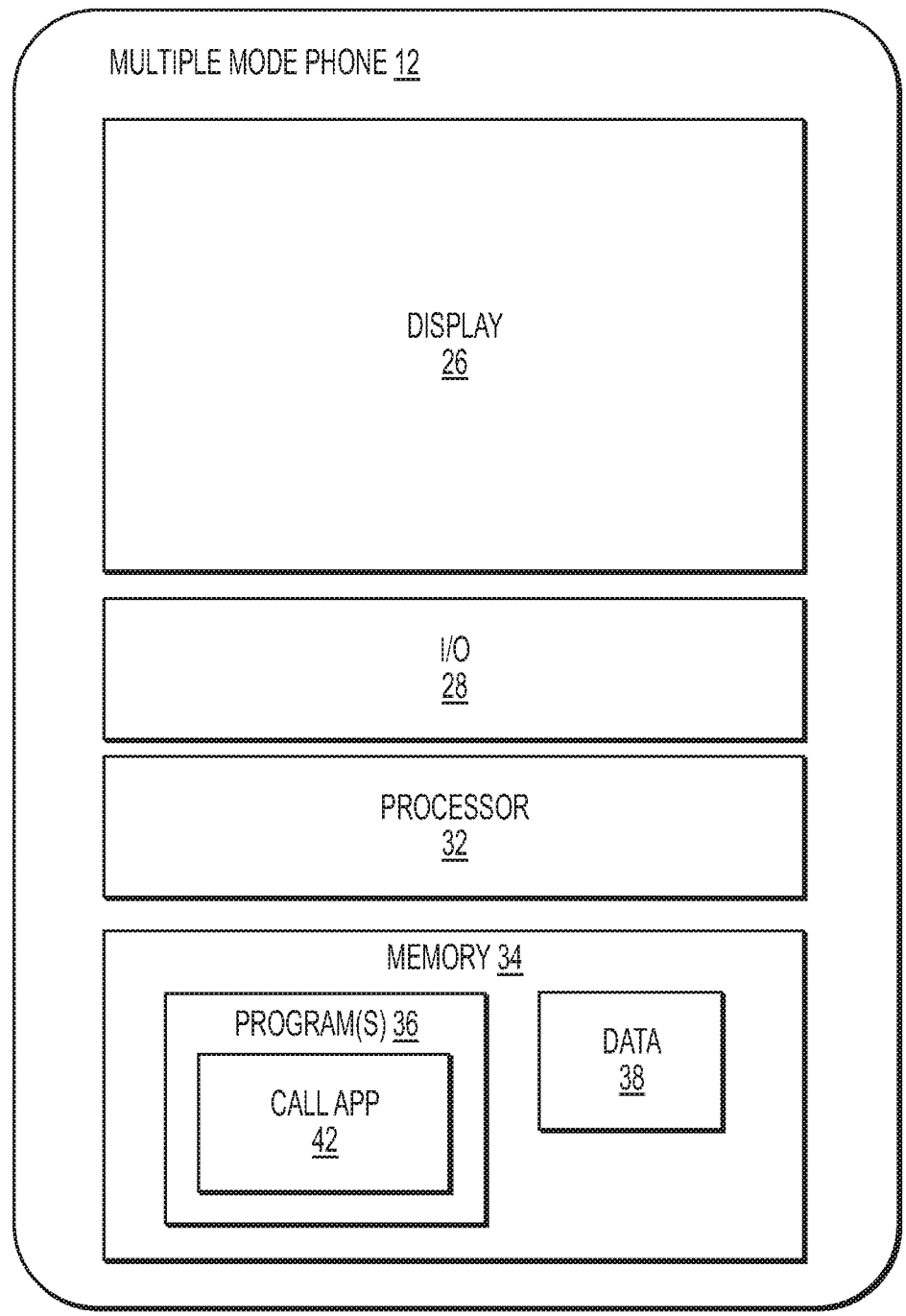
FIG. 2 is a component diagram of an example user device that can be used with the system of FIG. 1, consistent with the disclosed embodiments.

As shown in the example component diagram of FIG. 2, communication device 12 may be a "multi-mode" phone having a display 26, any number of input/output ("I/O") devices 28, one or more single- or multi-core processors 32, and a memory 34 having stored thereon one or more programs 36 and data 38. It should be noted that communication device 14 may have the same or a different component configuration. For example, communication device 14 may be a multi-mode or single-mode phone, computer, tablet, or the like that is capable of placing and/or receiving a call during a call session. The call session may consist of the transmission of audio and/or video data via the networks of phone system 10.

For the purposes of this disclosure, a multi-mode phone may be considered a phone that is capable of operating across at least Wi-Fi standards (e.g., 802.11) and radio standards (e.g., GSM, CDMA, and LTE). In some instances, a multi-mode phone may additionally be capable of operating across multiple radio standards. In these instances, the multi-mode phone may be commonly known as a tri-mode or quad-mode phone.

Display 26 of communication device 12 may include a liquid crystal display (LCD), a light emitting diode (LED) screen, an organic light emitting diode (OLED) screen, and/or another known display device. Display 26 may be used for display of video data under the control of processor 32.

I/O devices 28 may be configured to send and receive information. I/O devices 28 may include, for example, keyboards, mouse devices, buttons, switches, and/or a touchscreen panel (e.g., a panel integrated with display 26). I/O devices 28 may also include one or more communication modules (not shown) for sending information to and receiving information from other components of system 10 by establishing wireless connectivity between communication device 12 and one or more networks (e.g., Wi-Fi network 16, radio network 18, and/or PSTN 20—referring to FIG. 1).

Processor 32 may be configured with virtual processing technologies, and use program logic to simultaneously execute and control any number of operations. Processor 32 may be configured to implement virtual machine or other known technologies to execute, control, run, manipulate, and store any number of software modules, applications, programs, etc.

Memory 34 may include a volatile or non-volatile, magnetic, semiconductor, optical, removable, non-removable, or other type of storage device or tangible and/or non-transitory computer-readable medium that stores one or more executable programs 36, such as a call app 42, and data 38. Data 38 can include, for example, information that is personal to sender 22, account information, settings, and preferences.

In some embodiments, programs 36 include operating systems (not shown) that perform known functions when executed by processor 32. By way of example, the operating systems may include Microsoft Windows™, Unix™, Linux™, Apple™ operating systems, Android™ operating systems, such as Microsoft CE™, or other types of operating systems. Communication device 12 may also include communication software that, when executed by processor 32, provides communications with networks 16, 18, and/or 20 (referring to FIG. 1), such as Web browser software, tablet software, and/or smart handheld device networking software, etc.

Call app 42 causes communication device 12 to perform processes related to initiating a call session with communication device 14 via a user-selected network. For example, call app 42 may be able to configure communication device 12 to perform operations including: initiating a call session, assessing a quality of service of a network, generating and displaying a user interface for recommending a network for completion of the call session based on the quality of service assessment, receiving a user selection via I/O devices 28 of a desired network to use for the call session, and processing the received input to complete the call session (e.g., to place an outbound call or to receive an inbound call) based on the user selection.

Wi-Fi network 16 may be the default network used to wirelessly transport data received from communication device 12 at an access point 44, through an internet service provider (ISP) to exchange gateway 22, which is also in communication with PSTN 20. Access point 44 may include, for example, a local area network hub, a router, an Ethernet bridge, a modem, and/or other conventional computing components known in the art (e.g., a processor, input/output ports, a storage, and a memory). These components facilitate communication between device 12 and access point 44 and also between access point 44 and exchange gateway 22.

Radio network 18 may include a cellular grid of base stations 46, each consisting of radio receivers and transmitters. Communications generated by communication device 12 may be broadcast to a closest base station 46. From the closest base station 46, a communication service provider (CSP) may route the communications onward toward a user-defined destination. When the communications from communication device 12 is intended for a radio device, the CSP routes the communications from the base station 46 to another base station (not shown) that is nearest to the destination radio device, such that the nearest base station can broadcast the communications to the device. However, when the communications from communication device 12 is intended for a wired device or a Wi-Fi capable device, the CSP routes the communications as data from the closest base station 46 to the ISP via a data link (e.g., a 2/3/4G link) or directly to PSTN 20 via a non-data link.

PSTN 20 may be an aggregation of multiple different switched telephone networks that are operated by national, regional, and/or or local providers (e.g., commercial and governmental providers). PSTN 20 may include, among other things, communication infrastructure (e.g., lines, cables, switching centers, etc.) that allows analog and/or digital phones to communicate with each other. Data generated by communication device 14 may be relayed via a combination of different lines, cables, and/or switches to exchange gateway 22. From exchange gateway 22, the data may be routed onward toward a user-defined destination via additional lines, cables, and switches or via networks 16 and/or 18.

Exchange gateway 22 may be, for example, a server or a distributed system of multiple servers that cooperate to perform one or more of the processes and functionalities associated with the disclosed embodiments. For example, exchange gateway 22 can include one or more desktop computers, workstations, switching centers, handheld computing devices (smart phones or tablets), memory devices, and/or internal networks. As will be described in more detail below, exchange gateway 22 may be configured to manage access between communication devices 12 and 14 via any combination of networks 16-20.

Figure 3:
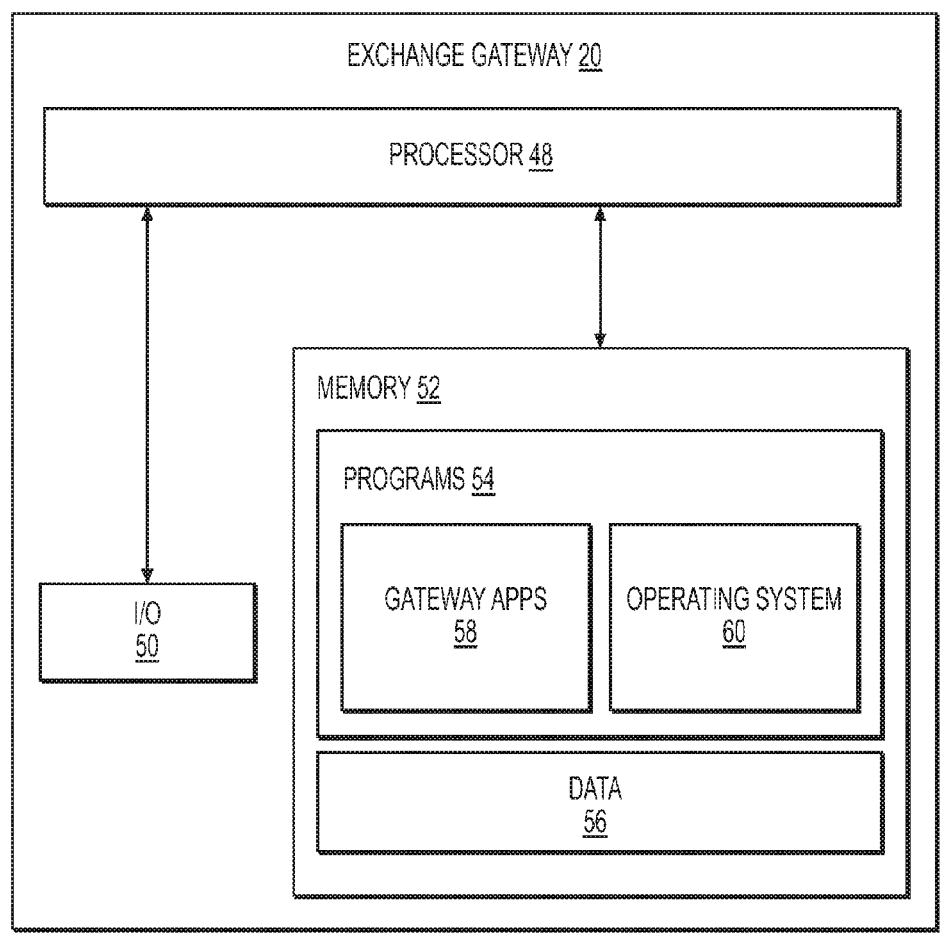
FIG. 3 is a component diagram of an example exchange gateway that can be used with the system of FIG. 1, consistent with the disclosed embodiments.

FIG. 3 shows an example diagram of exchange gateway 22, consistent with the disclosed embodiments. Exchange gateway 22 may include one or more processors 48, any number of input/output ("I/O") devices 50, and one or more memories 52 for storing programs 54 and data 56. Programs 54 may include, for example, any number of gateway apps 58 and an operating system 60.

Processor 48 may include one or more known computing devices that communicate with networks 16-20 (referring to FIG. 1), such as those described above with respect to processor 32 shown in FIG. 2. In addition, in some embodiments, processor 48 may include one or more specialized hardware, software, and/or firmware modules (not shown in figure) specially configured with particular circuitry, instructions, algorithms, and/or data to perform functions of the disclosed methods. It is appreciated that other types of processor arrangements could be implemented that provide for the capabilities disclosed herein.

Memory 52 can be a volatile or non-volatile, magnetic, semiconductor, optical, removable, non-removable, or other type of storage device or tangible and/or non-transitory computer-readable medium that stores one or more executable programs 54, such as gateway apps 54 and operating system 60. Common forms of non-transitory media include, for example, a flash drive, a flexible disk, a hard disk, a solid state drive, magnetic data storage medium, a CD-ROM, another optical data storage medium, any physical medium with patterns of holes, a RAM, a PROM, and EPROM, a FLASH-EPROM, another flash memory, NVRAM, a cache, a register, another memory chip or cartridge, and networked versions of the same.

Memory 52 may store instructions that enable processor 48 to execute one or more applications, such as gateway apps 54, operating system 60, and any other type of application or software known to be available on computer systems. Alternatively or additionally, the instructions, application programs, etc. can be stored in an internal and/or external database (e.g., a cloud storage system—not shown) that is in direct communication with exchange gateway 22, such as one or more databases or memories accessible over any one or more of networks 16-20. Memory 52 can include one or more memory devices that store data and instructions used to perform one or more features of the disclosed embodiments. Memory 52 can also include any combination of one or more databases controlled by memory controller devices (e.g., servers, etc.) or software, such as document management systems, Microsoft SQL databases, SharePoint databases, Oracle™ databases, Sybase™ databases, or other relational databases.

In some embodiments, exchange gateway 22 is communicatively connected to one or more remote memory devices (e.g., remote databases—not shown) through networks 16-20. The remote memory devices can be configured to store information that exchange gateway 22 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 54 may include one or more software or firmware modules causing processor 48 to perform one or more functions of the disclosed embodiments. Moreover, processor 48 can execute one or more programs located remotely from exchange gateway 22. For example, exchange gateway 22 can access one or more remote programs that, when executed, perform functions related to disclosed embodiments. In some embodiments, programs 54 stored in memory 52 and executed by processor 48 can include one or more of gateway apps 58 and operating system 60. Gateway apps 58 may cause processor 48 to perform one or more functions of the disclosed methods.

Operating system 60 may perform known operating system functions when executed by one or more processors such as processor 48. By way of example, operating system 60 may include Microsoft Windows™, Unix™, Linux™, or another type of operating system 56. Accordingly, disclosed embodiments can operate and function with computer systems running any type of operating system 60. Exchange gateway 22 can also include communication software that, when executed by a processor, provides communications via networks 16-20 (referring to FIG. 1) to one or more of communication devices 12 and 14.

I/O devices 50 may include one or more interfaces for receiving signals or input from devices and for providing signals or output to one or more devices that allow data to be received and/or transmitted by exchange gateway 22. For example, exchange gateway 22 can include interface components for interfacing with one or more input devices, such as one or more keyboards, mouse devices, and the like, which enable exchange gateway 22 to receive input from an operator or administrator (not shown).

Figure 4:
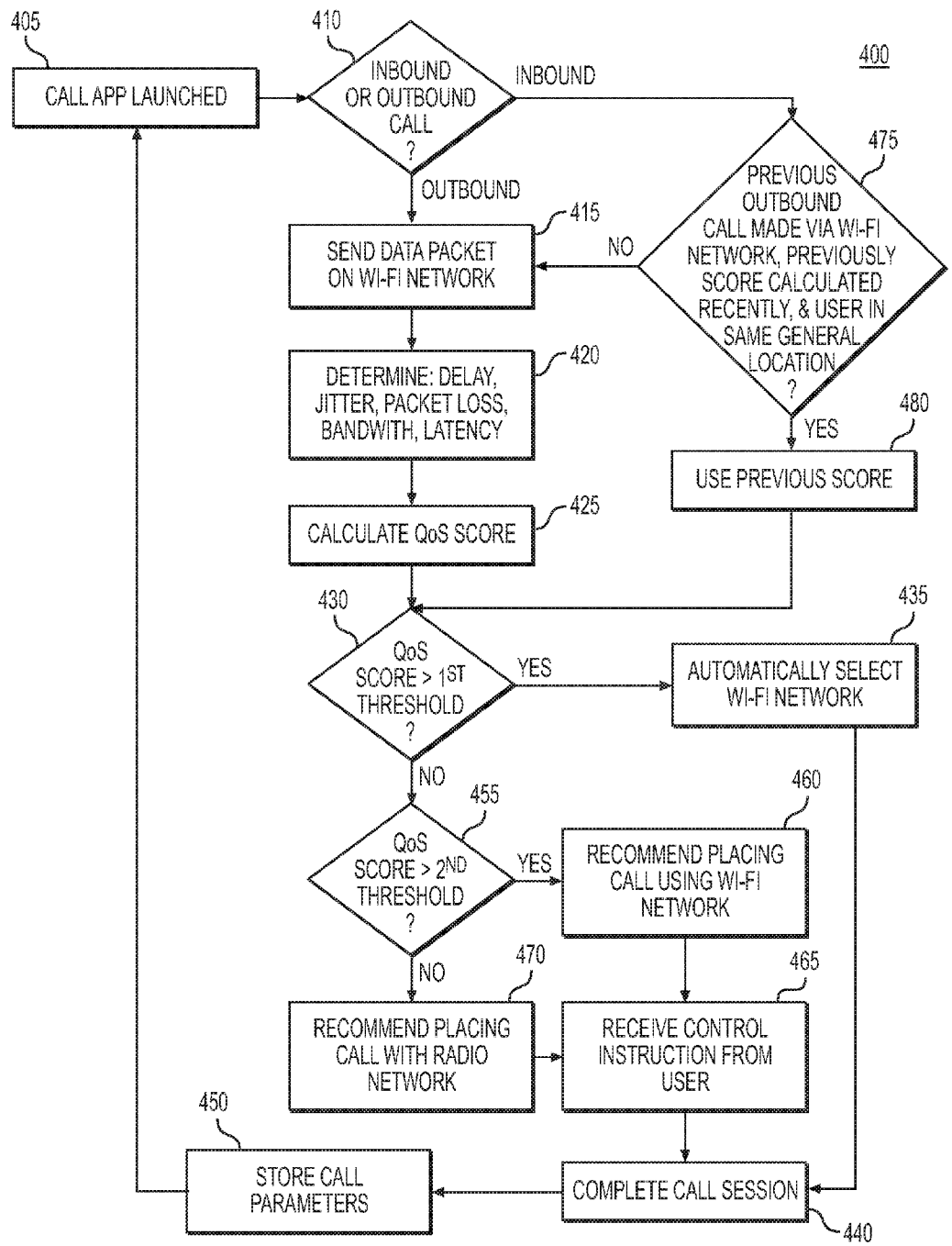
FIG. 4 illustrates a flowchart of an example method that may be performed by the system of FIG. 1 and/or the user device of FIG. 2, consistent with the disclosed embodiments.

FIG. 4 is a flowchart illustrating an example method 400 for communication in a communication device, consistent with the disclosed embodiments. It is appreciated that processor 32 of communication device 12 (referring to FIG. 2) may be configured to perform method 400. In some embodiments, one or more devices other than communication device 12 can perform one or more steps of method 400, such as, for example, processor 48 of exchange gateway 22. Method 400 of FIG. 4 may be followed only when multiple networks are available for a call session. It should be noted that, when only a single network is available for the call session, another method (not shown) may instead be followed. Accordingly, method 400 of FIG. 4 relies on an assumption of multiple available networks.

As shown in FIG. 4, method 400 can begin when call app 42 of communication device 12 is launched (Step 405). Call app 42 may be launched in any number of different ways based on a control instruction. For example, call app 42 may be launched when a user of communication device 12 manually clicks on, touches, or otherwise activates an associated icon (e.g., an icon shown on display 26), thereby generating the control instruction. In another example, call app 42 may be launched as the user dials a phone number, selects on a contact name, verbally provides the control instruction to place and/or receive a call, etc. In yet another example, call app 42 may be automatically launched by an advanced indication of an incoming call (e.g., a data message from exchange gateway 22 indicating that a call from another user has been placed, for example via communication device 14, with communication device 12 as the intended destination).

When call app 42 is launched at step 405, processor 32 of communication device 12 may determine the purpose of being launched (Step 410). Specifically, processor 32 may determine if call app 42 was launched for use in receiving an inbound call or placing an outbound call.

If processor 32 determines that call app 42 was awakened for use in placing an outbound call, processor 32 may assess a quality of service (QoS) of at least one of the networks currently available for use by communication device 12. In the disclosed embodiment, processor 32 may be configured to assess the quality of only Wi-Fi network 16, which is the default network for communication device 12. In other embodiments, however, it may be possible for processor 32 to also or alternatively assess the quality of service of radio network 18 (e.g., of the data link of radio network 18).

Processor 32 may be configured to assess the QoS of Wi-Fi network 16 by sending a test packet of data on Wi-Fi network 16, through access point 44 to exchange gateway 22 (Step 415). The test packet of data may be designed to simulate a normal media stream pattern on Wi-Fi network 16 (e.g., via a Real-Tim Transport Protocol, a Session Initiation Protocol, or another protocol that simulates the Real-Tim Transport Protocol), and parameters of Wi-Fi network 16 corresponding with the transmission of the test packet may be responsively determined. For example, a delay, a jitter, a packet loss, a bandwidth, and a latency of Wi-Fi network 16 may be determined (Step 420). A score indicative of the QoS provided by Wi-Fi network 16 may then be calculated, for example, as one or more functions of one or more of the parameters determined at step 420 (Step 425). This QoS score may be calculated using any combination of lookup tables, graphs, and/or equations. In some instances, one or more of the parameters may be more heavily weighted than other parameters during calculation of the QoS score, depending on an intended use of Wi-Fi network 16. In the disclosed embodiment, the QoS score may range from 0 to 100, with 0 being indicative of a non-functioning network and 100 being indicative of a fully functional or perfect-quality network.

In some embodiments, gateway 22 may determine the QoS parameters and generate a corresponding report that is returned to processor 32 for use in calculating the QoS score. In other embodiments, gateway 22 may additionally or alternatively loop the test packet of data back to processor 32 (e.g., as soon as it is received), which then determine additional QoS parameters for use in calculating the QoS score. With this configuration, the original test packet of data sent by processor 32 to gateway 22 may be used to assess a QoS from communication device 12 to gateway 22, while the looped-back test packet of data may be used to assess a QoS from gateway 22 to communication device 12. By assessing the QoS in both directions, processor 32 may have a more comprehensive indication of the overall quality of Wi-Fi network 16.

Processor 32 may then compare the QoS score calculated at step 425 to at least a first threshold, to determine if the QoS score is greater than the first threshold (Step 430). In one embodiment, the first threshold is about 75. The first threshold may be a fixed and stored value, variable and calculated, and/or user-adjustable (e.g., part of a user and/or device profile). As long as the QoS score calculated at step 425 is greater than the first threshold, processor 32 may automatically select Wi-Fi network 16 as the network to use when initiating the current call session (Step 435). In other words, a QoS of 75 or greater should be able to support any type of call (e.g., even a high-definition video call), without any quality issues being noticeable by the user. Processor 32 may then effect the call session (e.g., place the call) in accordance with user control instructions (e.g., based on the indicated or dialed number, selected contact, etc.) (Step 440). Processor 32 may then store within the memory of processor 32 any parameters associated with the call session (e.g., the QoS parameters determined at step 420 and/or the QoS score calculated at step 425 before the call was placed and/or QoS parameter and/or score that may be calculated during the call). Control may proceed from step 450 to step 405, so that method 400 may be repeated.

Returning to step 430, if processor 32 determines that the QoS score calculated at step 425 is less than the first threshold, processor 32 may then determine if the QoS score is greater than a lower second threshold (Step 455). In the disclosed embodiment, the lower second threshold is about 50. When processor 32 determines at step 455 that the QoS score is greater than about 50, processor 32 may not automatically default to initiating the call session using Wi-Fi network 16. Instead, processor 32 may only recommend initiating the call session using Wi-Fi network 16 (Step 460). In some instances, this recommendation may also include an alert associated with the QoS score, indicating that only low-definition video transmission may be available.

In one example, the recommendation of step 460 may come in the form of a graphic shown on display 26 of communication device 12. For example, a pop-up window may be shown that provides the recommendation visually. In addition, the user may be presented with an option to accept the recommendation and complete the call session using Wi-Fi network 16, or to override the recommendation and use radio network 18 (e.g., the 2/3/4G data link). These options may be selectable by the user, for example, by way of I/O devices 50. Processor 32 may receive the selection as control instructions (Step 465), and proceed to step 440 described above.

Returning to step 455, if processor 32 determines that the QoS score calculated at step 425 is less than the second threshold, processor 32 may then recommend initiating the call session with radio network 18 (e.g., via the 2/3/4G data link) (Step 470). Following step 470, the user may still be able to choose either network (i.e., Wi-Fi network 16 or radio network 18). In particular, control may proceed from step 470 to step 465, where the user may select the recommended network or override the network recommendation and provide corresponding control instructions to processor 32.

Handling of an inbound call may be performed in a slightly different manner, compared to placing an outbound call. Specifically, returning to step 410, when processor 32 determines that call app 42 was automatically launched by an inbound call (e.g., by the advanced indication of the incoming call provided by exchange gateway 22), processor 32 may then determine if a previous outbound call was placed using Wi-Fi network 16, if the QoS score calculated prior to making the previous outbound call was calculated recently (i.e., when a time period since the previous QoS score was calculated is less than a threshold period of time), and if the user is in the same general location from which the previous outbound call was placed (Step 475). In other words, processor 32 may determine if the current conditions are substantially the same as the conditions under which the previous outbound call was placed. If so, than the QoS score calculated for the previous outbound call probably has not changed much and may be a fairly close approximation of the current QoS score for Wi-Fi network 16. If any one or more of the conditions of step 475 have changed, control may proceed from step 475 to step 415, where the quality of service of Wi-Fi network 16 may be reassessed before connecting to a particular network and receiving the inbound call from exchange gateway 22.

However, when processor 32 determines at step 475 that the current conditions are substantially the same as the conditions under which the previous outbound call was made, processor 32 may use the previously calculated QoS score as the current QoS score (Step 480), and control may proceed to step 430. In other words, when processor 32 determines that the conditions are about the same, the quality of service of Wi-Fi network 16 may not need to be reassessed. This may help to save time and resources, in some instances.

Figure 5:
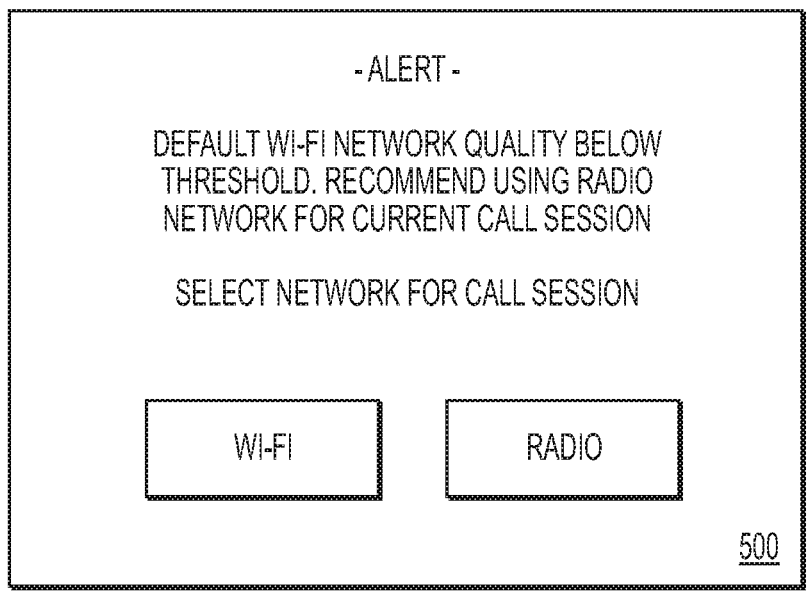
FIG. 5 illustrates an example interface associated with the phone system of FIG. 1, in accordance with the disclosed embodiments

FIG. 5 illustrates an example GUI 500, which may be shown on display 26 of communication device 12 (referring to FIG. 2) and that include features corresponding to some of the method steps described above and shown in FIG. 4. As can be seen in FIG. 5, GUI 500 may include a popup window shown in connection with steps 455-465. The popup window may alert the user of communication device 12 of the QoS score determined for the default Wi-Fi network 16. In addition, the popup window may recommend use of either the default Wi-Fi network 16 or radio network 18 for a current call session. Further, the popup window may allow the user to select the recommended network or to override the recommendation and select another network (e.g., by clicking on a corresponding virtual button).

Because the disclosed system may test a quality of service of a network before initiating a call session using the network, the user may not have to endure as many quality problems during the call session. In particular, a better call quality may be ensured before the call session is completed. In addition, the user may be provided with more control over how an inbound call is received or an outbound call is placed, by being provided with a recommendation that may be selected or overridden by the user.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as non-limiting, with a true scope and spirit being indicated by the following claims and their full scope of equivalents.

What is claimed is:

1. A method for providing communication in a communication device, comprising:
   receiving a first control instruction for initiating a call session via the communication device;
   assessing a quality of service (QoS) of at least one of a default Wi-Fi network or a radio network;
   selectively recommending the default Wi-Fi network for the call session based on the QoS assessment, comprising:
   (i) calculating a quality of service score for the default Wi-Fi network,
   (ii) making a first comparison of the quality of service score to a first threshold score and a second comparison of the quality of service score to a second threshold score, and
   (iii) outputting the recommendation comprising a definition-limited use of the default Wi-Fi network for the call session based on the first comparison and the second comparison, wherein the definition-limited use of the default Wi-Fi network comprises low-definition data transmission; and
   selecting one of the default Wi-Fi network or the radio network for establishing the call session based on a second control instruction, wherein the second control instruction is received in response to the recommendation.

2. The method of claim 1, wherein selectively recommending the default Wi-Fi network for the call session further comprises:
   generating a pop-up window on a screen of the communication device for selection of the default Wi-Fi network or the radio network for the call session.

3. The method of claim 1, wherein at least one of the first threshold score or the second threshold score is adjustable.

4. The method of claim 1, further comprising automatically initiating the call session using the default Wi-Fi network when the first comparison shows the quality of service score to be higher than the first threshold score.

5. The method of claim 1, wherein assessing the quality of service comprises simulating traffic on the default Wi-Fi network.

6. The method of claim 5, wherein simulating the traffic comprises sending a data packet from the communication device to a gateway connecting the default Wi-Fi network to a public switched telephone network.

7. The method of claim 6, wherein assessing the quality of service further comprises determining a delay, jitter, packet loss, bandwidth, and latency associated with transmission of the data packet on the default Wi-Fi network.

8. The method of claim 1, wherein, when the call session comprises an outbound call from the communication device, the method further comprises delaying initiating of the call session until after assessing the quality of service, selectively recommending use of the default Wi-Fi network, and receiving a control instruction regarding use of the default Wi-Fi and radio networks for the call session.

9. The method of claim 1, wherein:
   when the call session comprises an inbound call, the method further comprises:
   determining a previous quality of service score calculated for the default Wi-Fi network; and selectively recommending the default Wi-Fi network for the call session comprises recommending for selection the default Wi-Fi network for the call session based on the previous quality of service score.

10. The method of claim 9, wherein, when the call session comprises the inbound call, recommending for selection comprises:
recommending based on the previous quality of service score when a time period since the previous quality of service score was calculated is less than a threshold period of time, when a previous call session corresponding to the previous quality of service score was completed using the default Wi-Fi network, and when a location of the communication device has not changed by more than a threshold amount from a location at which the previous call session was completed.

11. A non-transitory computer-readable medium storing instructions that are executable by at least one processor to cause performance of a method for providing communication in a communication device, the method comprising:
receiving a first control instruction for a call session via the communication device;
assessing a quality of service of at least one of a default Wi-Fi network or a radio network;
selectively recommending the default Wi-Fi network for the call session based on the quality of service assessment, comprising:
(i) calculating a quality of service score for the default Wi-Fi network,
(ii) making a first comparison of the quality of service score to a first threshold score and a second comparison of the quality of service score to a second threshold score, and
(iii) outputting the recommendation comprising a definition-limited use of the default Wi-Fi network for the call session based on the first comparison and the second comparison, wherein the definition-limited use of the default Wi-Fi network comprises low-definition data transmission; and
initiating the call session using the at least one of the default Wi-Fi network or the radio network based on a second control instruction, wherein the second control instruction is received in response to the recommendation.

12. The non-transitory computer-readable medium of claim 11, wherein selectively recommending the default Wi-Fi network for the call session further comprises:
generating a pop-up window on a screen of the communication device allowing for selection of at least one of the default Wi-Fi network or the radio network for the call session.

13. The non-transitory computer-readable medium of claim 11, wherein at least one of the first threshold score or the second threshold score is adjustable.

14. The non-transitory computer-readable medium of claim 11, wherein, when the call session comprises an outbound call from the communication device, the method further comprises delaying initiating of the call session until after assessing the quality of service, selectively recommending use of the default Wi-Fi network, and receiving the second control instruction regarding use of the default Wi-Fi and radio networks for the call session.

15. The non-transitory computer-readable medium of claim 11, wherein:
when the call session comprises an inbound call, the method further comprises determining a previous quality of service score calculated for the default Wi-Fi network; and
selectively recommending the default Wi-Fi network for the call session comprises recommending for selection the default Wi-Fi network for the call session based on the previous quality of service score when a time period since the previous quality of service score was calculated is less than a threshold period of time, when a previous call session corresponding to the previous quality of service score was completed using the default Wi-Fi network, and when a location of the communication device has not changed by more than a threshold amount from a location at which the previous call session was completed.

16. A system for providing communication in a communication device, the system comprising:
a memory having computer-executable instructions stored thereon; and
one or more processors configured to execute the stored instructions to:
receive a first control instruction to initiate a call session via the communication device;
assess a quality of service of at least one of a default Wi-Fi network or a radio network;
selectively recommend the default Wi-Fi network for the call session based on the quality of service assessment, comprising:
(i) calculating a quality of service score for the default Wi-Fi network,
(ii) making a first comparison of the quality of service score to a first threshold score and a second comparison of the quality of service score to a second threshold score, and
(iii) outputting the recommendation comprising a definition-limited use of the default Wi-Fi network for the call session based on the first comparison and the second comparison, wherein the definition-limited use of the default Wi-Fi network comprises low-definition data transmission; and
initiating the call session using the default Wi-Fi network or the radio network based on a second control instruction, wherein the second control instruction is received in response to the recommendation,
wherein:
when the call session comprises an outbound call, the one or more processors delay initiating the call session until after assessing the quality of service; selectively recommending use of the default Wi-Fi network, and receiving a control instruction regarding use of the default Wi-Fi and radio networks for the call session; and
when the call session comprises an inbound call, the one or more processors determine a previous quality of service assessment for the default Wi-Fi network, and selectively recommends the default Wi-Fi network for the call session based on the previous quality of service assessment.

* * * * *